US005781694A

United States Patent [19]

Kikuchi et al.

[11] Patent Number: 5,781,694

[45] Date of Patent: Jul. 14, 1998

[54] HEATSENSITIVE STENCIL SHEET PERFORATING DEVICE

[75] Inventors: Makoto Kikuchi; Kengo Kodama, both of Ibaraki-ken, Japan

[73] Assignee: Riso Kagaku Corporation, Tokyo, Japan

[21] Appl. No.: 634,551

[22] Filed: Apr. 18, 1996

[30] Foreign Application Priority Data

Apr. 28, 1995 [JP] Japan .................................... 7-105605

[51] Int. Cl.[6] .......................... B41L 1/055; G03B 27/04; H01H 3/16; F27D 21/00

[52] U.S. Cl. .......................... 392/418; 219/386; 219/412; 355/118; 355/120; 200/61.7; 200/61.78; 101/470

[58] Field of Search ..................................... 219/385, 386, 219/412; 392/418; 200/61.62, 61.7, 61.71, 61.78; 355/118, 120; 101/128.4, 470

[56] References Cited

U.S. PATENT DOCUMENTS

| | | | |
|---|---|---|---|
| 4,184,428 | 1/1980 | Hosoya | 101/128.4 |
| 4,556,765 | 12/1985 | Shaw et al. | 200/61.71 |
| 4,764,648 | 8/1988 | Resh | 200/61.62 |
| 5,396,396 | 3/1995 | Watanabe | 200/61.62 |
| 5,600,976 | 2/1997 | Hapke et al. | 200/61.62 |

FOREIGN PATENT DOCUMENTS

| | | |
|---|---|---|
| 64-72883 | 3/1989 | Japan . |
| 1579458 | 11/1980 | United Kingdom . |
| 1579459 | 11/1980 | United Kingdom . |

*Primary Examiner*—Teresa J. Walberg
*Assistant Examiner*—J. Pelham
*Attorney, Agent, or Firm*—Kanesaka & Takeuchi

[57] ABSTRACT

The heatsensitive stencil sheet perforating device of this invention includes a pedestal for an original mounted thereon; a pressing body attached pivotaly on one end of the pedestal for supporting a heatsensitive stencil sheet on an area corresponding to the original mounted on the pedestal; a light irradiation device attached detachably to the pressing body in a defined state, including a light source for irradiating the heatsensitive stencil sheet; a power supply device installed inside of the pressing body, for supplying electric energy to emit light from the light source; a first contact member attached to the light irradiation device, connected to the light source; a second contact member attached to the pressing member, connected to the power source of the power supply device, so as to come into contact with the first contact member when the light irradiation device is engaged in the pressing body in a defined state; and a support member attached to the pressing body, for supporting the light irradiation device by receiving a part of the light irradiation device not to bring the first contact member into contact with the second contact member, when the light irradiation device is attached to the pressing body not in the defined state.

5 Claims, 5 Drawing Sheets

HEATSENSITIVE STENCIL SHEET PERFORATING DEVICE

BACKGROUND OF THE INVENTION

The present invention relates to a heatsensitive stencil sheet perforating device for processing a perforating by using a heatsensitive stencil paper.

FIG. 5 is a perspective view illustrating the heatsensitive stencil sheet perforating device proposed by the applicant of the present invention.

This device has a pedestal 101 including a base 104 for an original to be mounted thereon, and a pressing plate 102 attached pivotaly on the pedestal 101.

The pressing plate 102 has an opening 106 cutting an area facing the base 104. On the back side of the pressing plate 102, a transparent plate 107 is attached which covers the opening 106 and holds a heatsensitive stencil sheet thereon. A light irradiation device 103 is attached detachably into the opening 106 from the front side of the pressing plate 102.

The light irradiation device 103 is generally called a lamp house. The lamp house 103 has a box structure having a virtually quadrate pyramid inner surface with bottom open. Inside the lamp house 103, bulbs 113 are installed for a light source. By a power supply device housed inside the pressing plate 102 not illustrated, the bulbs 113 emit light and irradiate a heatsensitive stencil sheet supported by the pressing plate 102.

On the outer surface of an edge 103*a* of the lamp house 103, a contact 114 connected electrically to the bulbs 113 is attached. On the surface of the opening 106 of the pressing plate 102, a spring electrode terminal 118 is attached which is electrically connected to the power supply housed inside of the pressing plate 102. When the lamp house 103 is engaged in the opening 106 of the pressing plate 102, the electrode terminal 118 comes into contact with the contact 114.

Perforating by using this device is done as follows: attaching the lamp house 103 onto the front surface of the pressing plate 102; attaching a heatsensitive stencil sheet (not illustrated) on the back surface of the pressing plate 102; mounting a copy (not illustrated) on the base of the pedestal 101; pressing the pressing plate 102 toward the pedestal 101. Thus, the power supply is connected to the bulbs 113, and a flash perforation is done.

However, in the foregoing conventional heatsensitive perforating device, as shown in FIG. 6, it is possible that the lamp house 103 cannot perfectly be engaged in the opening 106 of the pressing plate 102 and be held slant; consequently, there will be a gap S between the edge 103*a* of the lamp house 103 and the transparent plate 107. However, even in this state, there can be a contact between the contact 114 and the electrode terminal 118.

And in this state, if heatsensitive stencil sheet perforating operation starts, light will come out through the gap S between the edge 103*a* of the lamp house 103 and the transparent plate 107; sufficient quality of light cannot be obtained, causing a defective of perforating.

And therefore, the object of this invention is , through solving the above-mentioned problem, to provide a heatsensitive stencil sheet perforating device capable of producing a good and stable quality of perforation and preventing a defective of perforation by an insufficient engagement in the lamp house.

SUMMARY OF THE INVENTION

The heatsensitive stencil sheet perforating device according to a first aspect comprises a pedestal for an original mounted thereon; a pressing body attached pivotaly on one end of the pedestal, for supporting a heatsensitive stencil sheet on an area corresponding to the original mounted on the pedestal; a light irradiation device attached detachably to the pressing body, said light irradiation device having a light source for irradiating the heatsensitive stencil sheet; a power supply device installed inside of the pressing body for supplying electric energy to the light irradiation device to emit light from the light source; a first contact member attached to the light irradiation device, and connected to the light source; a second contact member attached to the pressing member, and connected to the power source of the power supply device so as to come into contact with the first contact member when the light irradiation device is attached to the pressing body in a defined state; and a support member attached to the pressing body, for supporting the light irradiation device by receiving a part of the light irradiation device so as not to bring the first contact member into contact with the second contact member, when the light irradiation device is attached to the pressing body not in the defined state.

The heatsensitive stencil sheet perforating device according to a second aspect comprises a pedestal for an original mounted thereon; a pressing body attached pivotaly on one end of the pedestal, said pressing body having a first opening and a transparent member, said first opening being formed on an area corresponding to the original on the pedestal, and cut from the back side facing the pedestal to the front side, the opposite side of the back side, said transparent member being attached to the opening of the back side of the first opening for supporting a heatsensitive stencil sheet; a light irradiation device attached detachably in a desired state to the first opening from the front side of the pressing body, said light irradiation device having a housing including a second opening with virtually the same circumferential shape as that of the first opening of the pressing body and a light source installed inside of the housing for irradiating the heatsensitive stencil sheet from the second opening through the first opening of the pressing body; a power supply device installed inside of the pressing body, for supplying electric energy to the light irradiation device to emit light from the light source; a first contact member connected to the light source, and attached to a part adjacent to the second opening of the housing of the light irradiation device; a second contact member attached on the first opening of the pressing body, and connected to the power source of the power supply device so as to come into contact with the first contact member, when the light irradiation device is attached in the first opening of the pressing body in a defined state; and a support member formed in the first opening of the pressing body, for supporting the light irradiation device by receiving a part of the light irradiation device so as not to bring the first contact member into contact with the second contact member, when the light irradiation device is attached to the pressing body not in the defined state.

The heatsensitive stencil sheet perforating device according to a third aspect in the heatsensitive stencil sheet perforating device as in the second aspect, is characterized in that the supporting member is made of an elastically deformable material.

The heatsensitive stencil sheet perforating device according to a fourth aspect, in the heatsensitive stencil sheet perforating device as in the third aspect, the second contact member is an elastic member placed in the first opening of the pressing body; the support member is an elastic member placed at a farther position from the transparent member than that of the second contact member, in the first opening of the pressing body; the defined state is a state where the second opening of the light irradiation device is virtually in contact with the transparent member, when the light irradiation device is put into the first opening of the pressing body; in the first case where the light irradiation device is attached to the pressing body as not in the defined state when the light irradiation device is put into the first opening of the pressing body, the housing of the light irradiation device is held on the support member, causing the first contact member not to bring into contact with the second contact member; in the second case where the light irradiation device is attached to the pressing body in the defined state, the support member is elastically deformed to hold the housing of the light irradiation device and the second contact member comes into contact with he first contact member.

The heatsensitive stencil sheet perforating device according to a fifth aspect, in the heatsensitive stencil sheet perforating device as in the fourth aspect, has a switch to electrically connect the light irradiation device to the power supply device when the pressing body is urged toward the base and the heatsensitive stencil sheet attached to the pressing body is brought into contact with the copy on the pedestal.

Since the support member is attached on the pressing body, at a place before the second contact capable of coming in contact with the first contact of the light irradiation device, in the direction of inserting the light irradiation device, when the light irradiation device is attached onto the pressing body, a part of the device is held on the support member, which holds the first contact in noncontact with the second contact.

Pressing further the light irradiation device downward will deform the elastic support member, attaching firmly the light irradiation device onto the pressing body in the desired state, bringing the first contact into contact with the second contact.

When the light irradiation device is attached onto the pressing body in the desired state, the support member is elastically deformed, giving a feeling of click stop to the operator.

Before the light irradiation device is attached to the pressing body in the defined state, the first and second contact will be held in a noncontact state; and therefore, the light source will not emit light, the light irradiation device can be operated only when it is firmly attached to the pressing body in the defined state.

DESCRIPTION OF THE PREFERRED EMBODIMENTS

One embodiment of this invention will now be described in detail with reference to the drawings.

Figure 1:
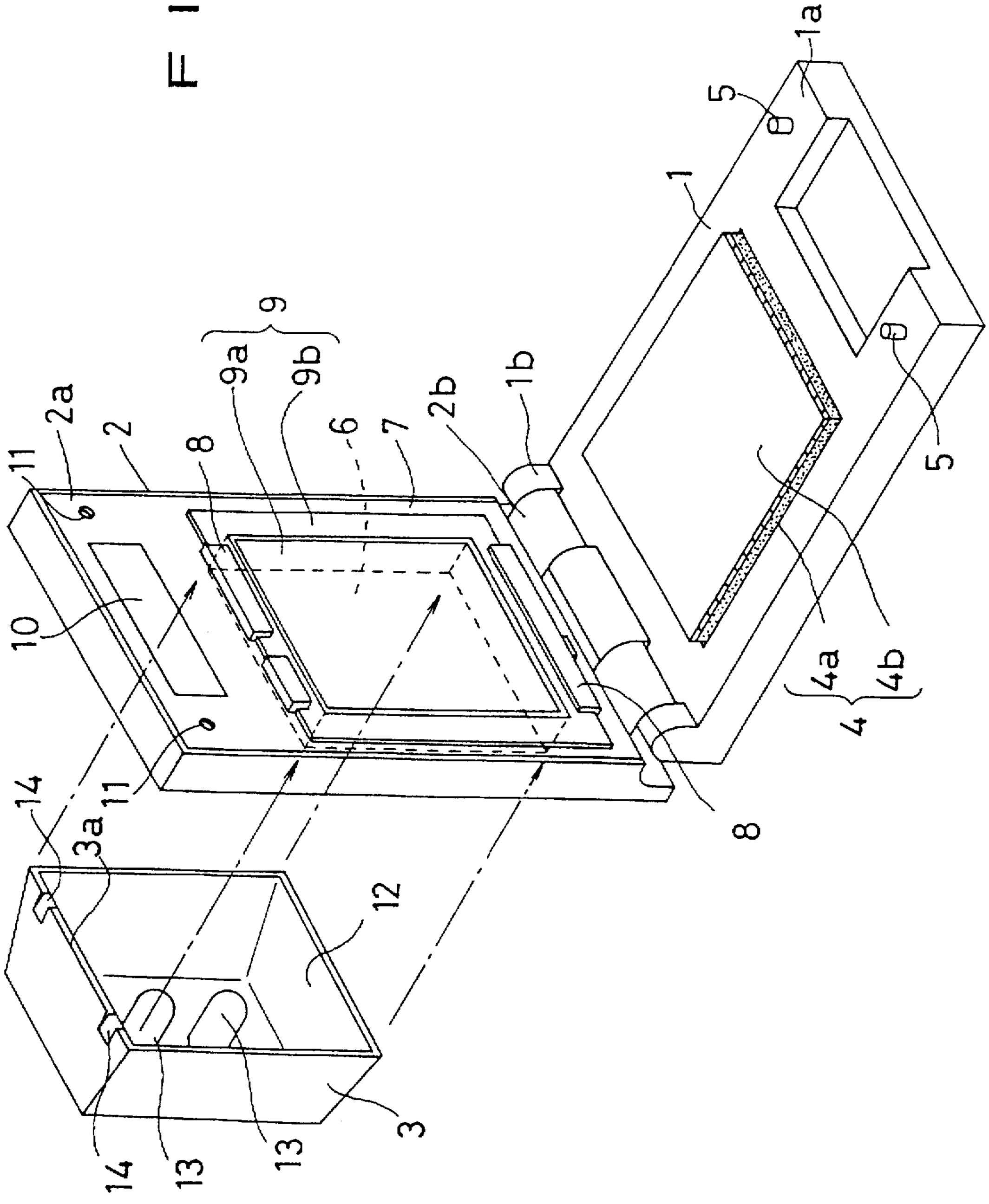
FIG. 1 is a perspective view showing one embodiment of the heatsensitive stencil sheet perforating device according to this invention.

FIG. 1 is a perspective view showing a heatsensitive stencil sheet perforating device according to this invention.

As shown in FIG. 1, the heatsensitive stencil sheet perforating device according to this invention is virtually comprised of a pedestal 1, a pressing plate 2 as a pressing body, and a light irradiation device 3.

The pedestal 1 is made of a nonconductive material such as a synthetic resin, and has a flat base 4 on its central area of the surface. The base 4 is formed of a cushioning member 4a such as a urethane foam for its base, and a rubber-bonded member 4b for its upper surface. And, an original mounted on the base 4 is firmly held by an adhesion of the rubber-bonded member 4b.

On both right and left sides of front ends 1a of the pedestal 1, pins 5, 5 are projected, respectively. The pins 5, 5 are actuators of a switch for a power supply device as described later.

A pressing plate 2 is made of a nonconductive material such as a synthetic resin, whose rear end 2b is fitted pivotaly in a rear end 1b of the pedestal 1.

The pressing plate 2 is equipped with an opening 6 on an area corresponding to the base 4. This opening 6 is covered by a transparent plate 7 made of a transparent material including a synthetic resin on the surface of the pressing plate 2 facing the pedestal 1 (hereinafter, call the surface facing the pedestal the back surface).

And, a holding means 8 is placed on the back of the transparent plate 7 so as to coincide with the inner edge of the opening 6. The holding means 8 holds the outer edge of a frame 9b of a heatsensitive stencil sheet 9 which comprises a stencil 9a and a frame 9b.

A lid 10 is attached on the back surface of a front end 2a of the pressing plate 2, and inside of the lid 10, a power supply device as described later is housed with a battery installed.

Furthermore, on the back surface of the front end 2aof the pressing plate 2, engagement holes 11, 11 are recessed at positions corresponding to the pins 5, 5 of the pedestal 1, respectively.

A light irradiation device 3 is made of a nonconductive material including a synthetic resin, is equipped with a reflecting mirror 12 on the inner surface, and has a virtually quadrate pyramid housing with its one end open corresponding to the opening 6 of the pressing plate 2. On the inner back of the housing, flash bulbs as a light source 13 are detachably attached with a socket structure as not illustrated.

And, on the outer surface of the edge 3a of the opening part of the light irradiation device 3, a contact 14 is attached which is electrically connected to the light source 13.

The light irradiation device 3 is engaged in the opening 6 of the pressing plate 2 from the front surface, the opposite surface to the pedestal 1 (hereinafter, call the opposite surface to the pedestal the front surface), so as to face the edge 3a toward the transparent plate 7.

The power supply device housed in the front end 2a of the pressing plate 2 will now be described.

Figure 2:
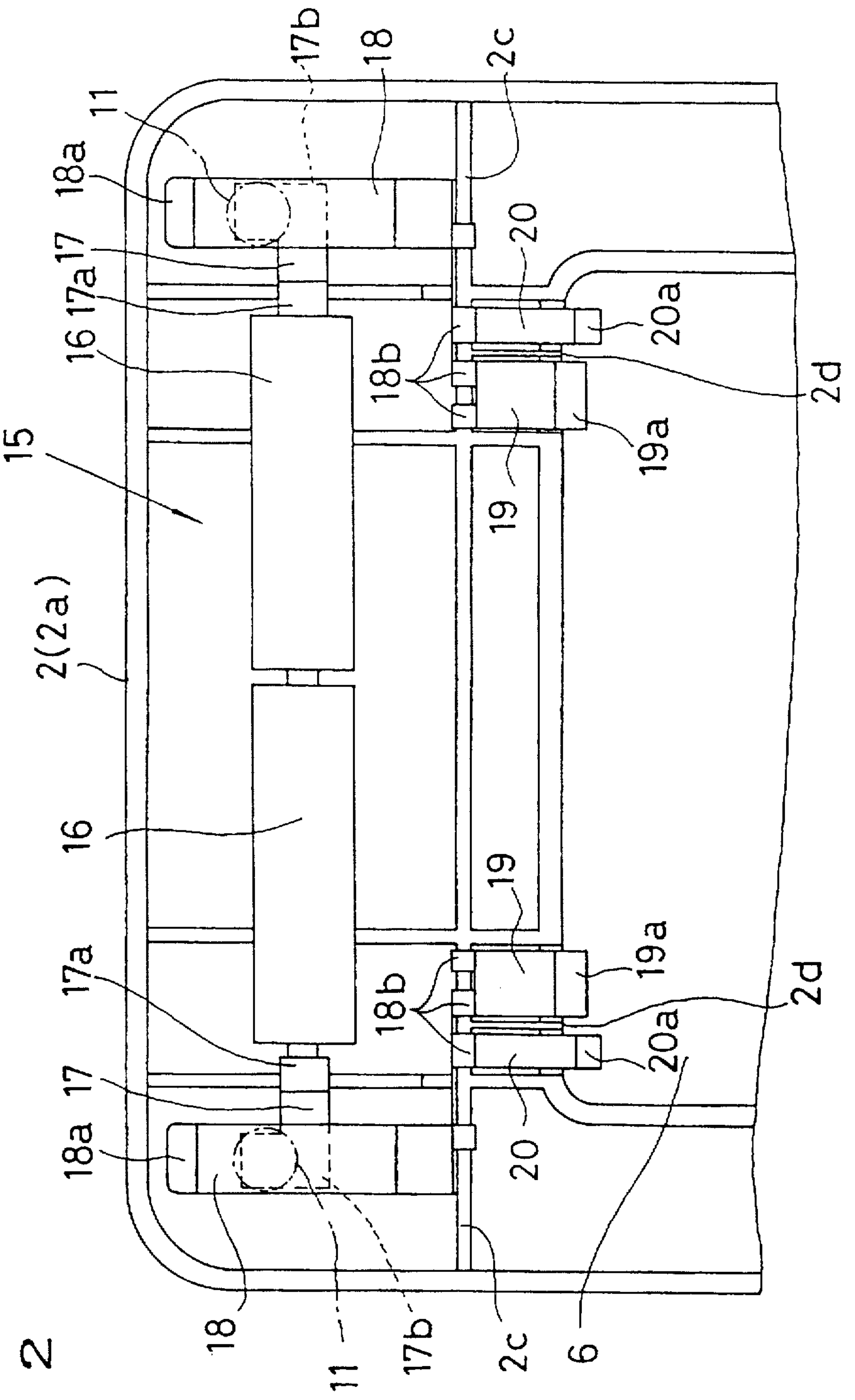
FIG. 2 is a plan view showing an important part of the invention.
Figure 3:
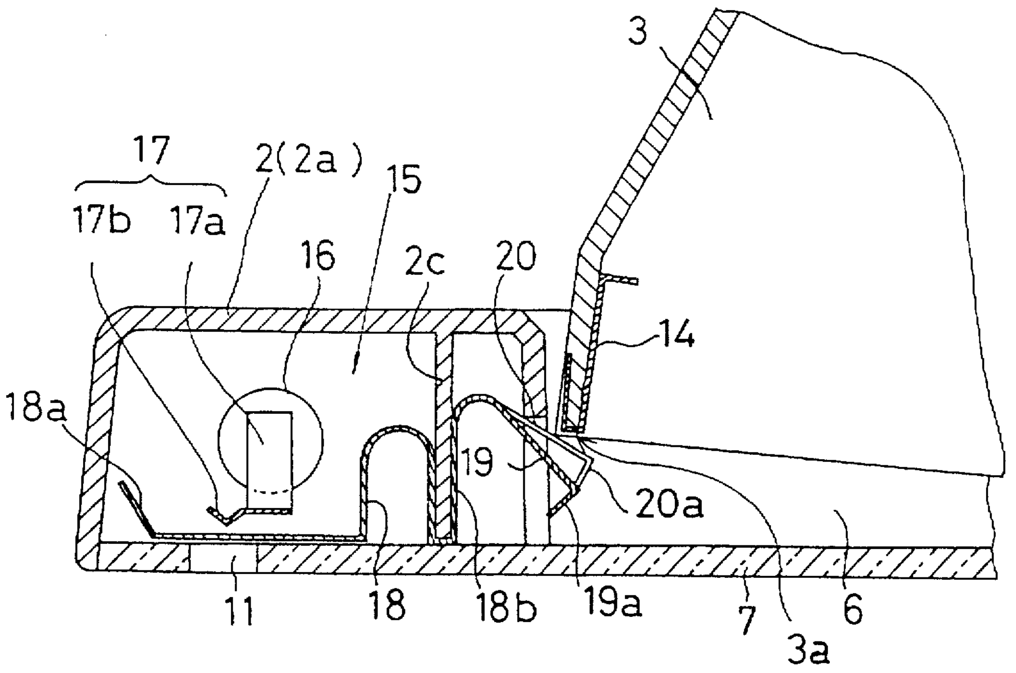
FIG. 3 is a sectional side elevation in FIG. 2.

FIG. 2 is a partial plan view of the pressing plate, FIG. 3 is a sectional side elevation in FIG. 2. FIG. 2 shows an appearance of the inside of the pressing plate 2 viewed from the back surface.

As shown in FIG. 2 and FIG. 3, the power supply 15 supplies the electric energy of a battery 16 installed inside of the front end 2a of the pressing plate 2 to the light irradiation device 3, and has inner contacts 17, 17 corresponding to each of both electrode terminals of the battery 16 and electrode members 18, 18 forming a switch for the power supply device 15 with the inner contacts 17, 17.

The inner contacts 17 are made of a conductive sheet metal one end, *17a* of each conductive sheet is electrically connected to each electrode terminal of the battery 16, and the other ends **17*b* partially bent is placed on the upper side of the engagement hole 11 formed on the back surface of the pressing plate 2**.

The electrode members 18 are made of a conductive sheet metal one end **18*a* of each conductive sheet, extends to cover each of the engagement holes 11 formed on the back surface of the pressing plate 2 and is placed so as to be in noncontact with each of the other ends 17*b* of the inner contacts 17 between the end 17*b* and the engagement hole 11**.

The middle part of the electrode member 18 is supported by a beam support plate **2*c* formed inside of the front end 2*a* of the pressing plate 2, and the other end 18*b*extends out into the opening 6 of the pressing plate 2**.

The other end **18*b* of the electrode member 18 is formed integrally with a contact 19 projected into the opening 6**.

The contact 19 is bent in a shape resembling virtually the letter U and has elasticity. Each of the front ends **19*a* of the contacts 19 is formed at a position where each of the front ends 19*a* is able to come into contact with each of the contacts 14 of the light irradiation device 3 when the light irradiation device 3 as described above is engaged in the opening 6. And, the other end 18*b* of the electrode member 18 is also formed integrally with a support member 20 protruded into the opening 6**.

The support member 20 is bent in a shape resembling virtually the letter U and has elasticity. The front end **20*a* of the support member 20 is formed at a position where the front end 20*a* does not come into contact with the contact 14, but can support the edge 3*a* of the opening part of the light irradiation device 3 when the light irradiation device 3 is engaged in the operating 6. Furthermore, since the support member 20 is bent into a wider angle than the contact 19, it is located farther from the transparent plate 7 than the contact 19. In other words, the support member 20 is placed before the contact 19 in the direction of inserting the light irradiation device 3 into the pressing plate 2**.

The contact 19 and the support member 20 are separated in-between by a beamform partition **2*d* placed inside of the front end 2*a* of the pressing plate 2**, so as not to bring both in contact.

To carry out a perforation using this heatsensitive perforating device, as shown in FIG. 1, mounting an original on the base 4 of the pedestal 1, attaching a heatsensitive stencil sheet 9 on the transparent plate 7 covering the back surface of the pressing plate 2, and engaging the light irradiation device 3 in the front surface of the pressing plate 2 are needed.

To engage the light irradiation device 3 in the pressing plate 2, as shown in FIG. 3, facing the opening part of the edge **3*a* toward the transparent plate 7, and positioning the light irradiation device 3 at the opening 6 of the pressing plate 2 so as to mount each of the contacts 14, 14 onto each of the contacts 19, 19**, correspondingly, are needed.

Since the edge **3*a* of the light irradiation device 3, made of a nonconductive material, is supported by the support member 20 formed on the other end 18*b* of the electrode member 18, a certain gap is kept between the contact 14 of the light irradiation device 3 and the contact 19 of the electrode member 18, which keeps the contact 14 and the contact 19** in a noncontact state.

Figure 4:
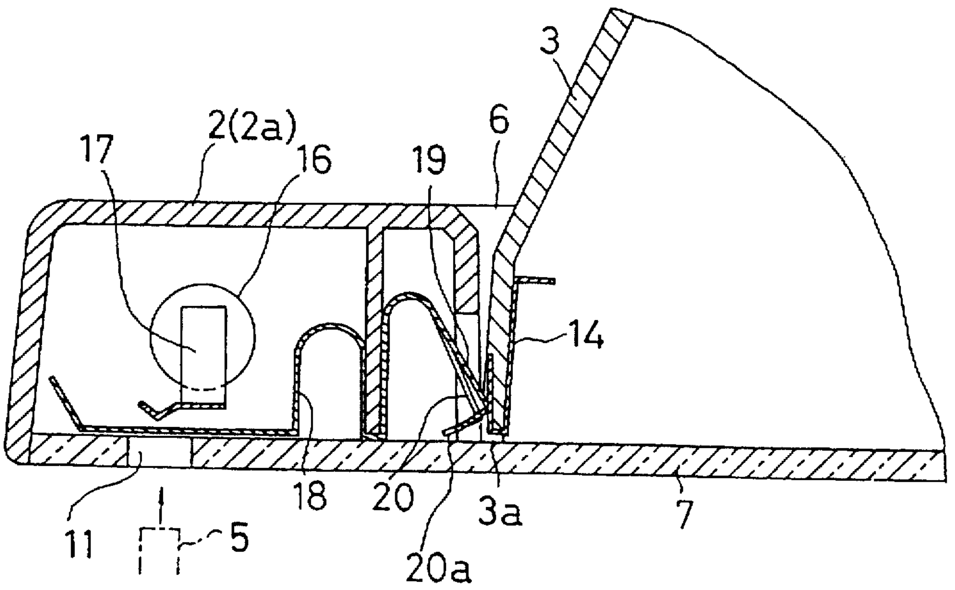
FIG. 4 is an operational view in FIG. 3.
Figure 5:
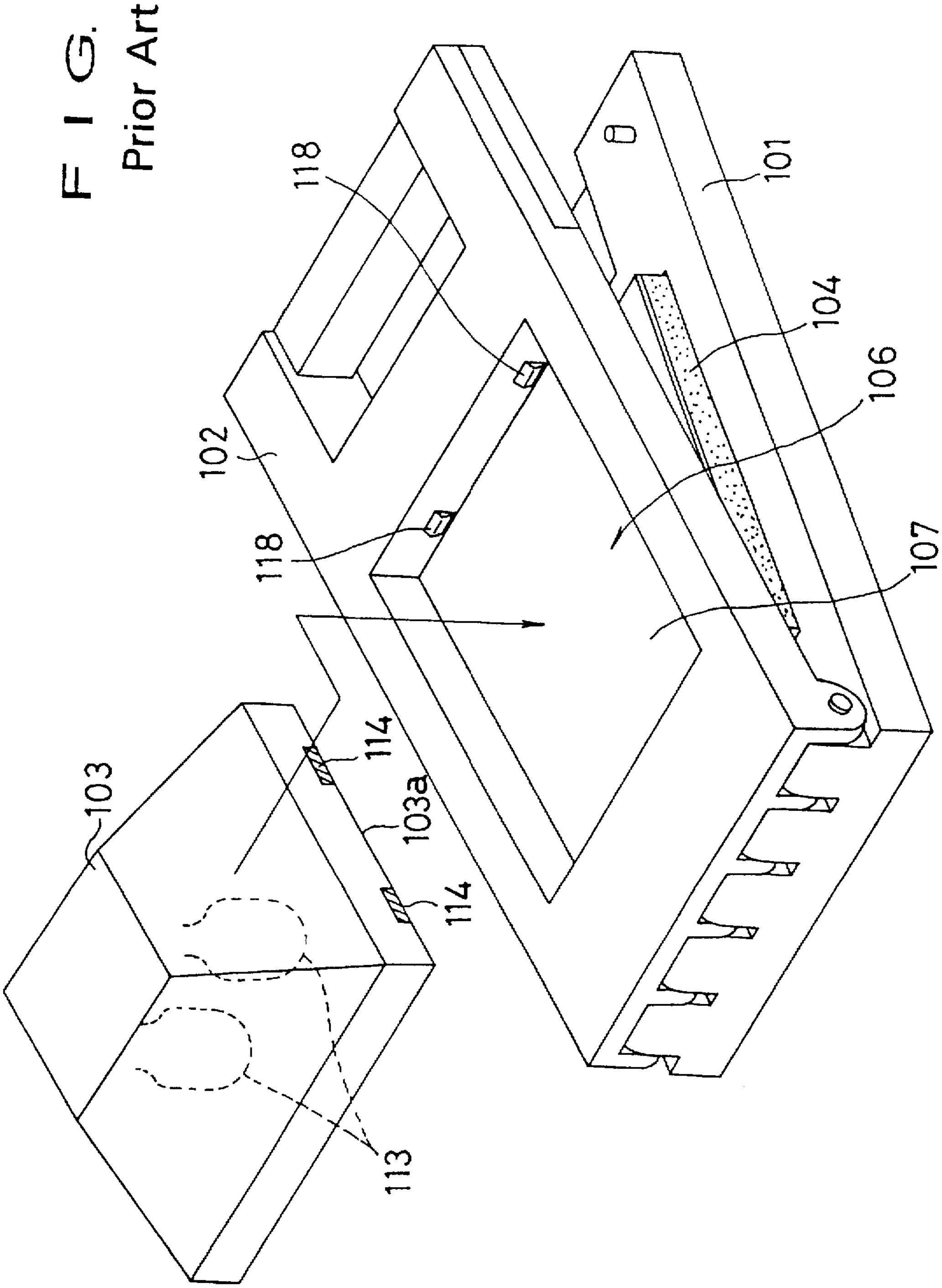
FIG. 5 Prior Art
FIG. 5 is a perspective view showing a conventional heatsensitive perforating device.
Figure 6:
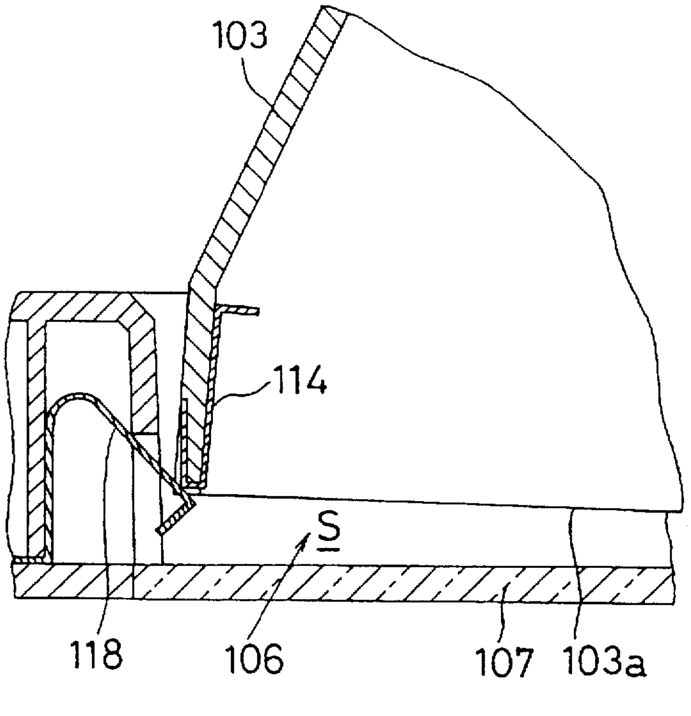
FIG. 6 Prior Art
FIG. 6 is a sectional side elevation of the important part in FIG. 5.

And afterward, as shown in FIG. 4, further pressure is applied to put the light irradiation device 3 into the opening 6. The light irradiation device 3 is attached such that the edge **3*a* is in contact with the transparent plate 7 without a gap, or the light irradiation device 3 is attached to the opening 6** firmly in a defined attitude.

In this state, each of the contacts 19, 19 is in contact with each of the contacts 14, 14 of the light irradiation device 3. And, each of the support members 20, 20 pushes up the edge **3*a* of the light irradiation device 3 by its elasticity (shown in FIG. 3), before the light irradiation device 3 is engaged firmly in the defined attitude; in the state where the light irradiation device 3 is firmly engaged in the pressing plate 2 in the defined attitude, the outer rim of the edge 3*a* of the light irradiation device 3 is pressed by the elastic deformation to hold the light irradiation device 3 in the opening 6 of the pressing plate 2 (shown in FIG. 4**).

While the light irradiation device 3 is attached to the pressing plate 2 in the desired attitude, at the moment the edge **3*a* of the light irradiation device 3 goes over the bending part of the front end 20*a* of the support member 20, the support member 20** is elastically deformed, giving a feeling of click.

Next, when the front end **2*a* of the pressing plate 2 is pressed down toward the pedestal 1, each of the pins 5, 5 attached on the pedestal 1 passes through the engagement holes 11, 11 formed on the back surface of the pressing plate 2, pushing up the one end 18*a* of the electrode member 18. The one end 18*a* of the electrode member 18 is deformed, which electrically connects the inner contact 17 to the terminal of the battery 16 to emit light from the light source 13**, and perforating is being processed. Carbon parts in an original exposed to a flash heat up, forming a perforated image corresponding to the original image on the heatsensitive film of a heatsensitive stencil sheet overlaid on the original.

Therefore, in the heatsensitive stencil sheet perforating device thus constituted, the contact 14 and the contact 19 are temporally held in a noncontact state when putting the light irradiation device 3 into the opening 6 of the pressing plate 2, because the support member 20 is located on the upper side to the contact 19 capable of being in contact with the contact 14 of the light irradiation device 3 and the edge **3*a* is supported by the support member 20**.

And, the supporting of the light irradiation device 3 in this irregular position elastically deforms the support member 20 and the supporting is released by further pressing the light irradiation device 3; thus, only when the light irradiation device 3 is firmly engaged in the pressing plate 2 in the defined attitude, the contact 14 can be in contact with the contact 19. The above-mentioned structure of the device according to this invention prevents a defective of perforating by an insufficient attachment of the light irradiation device 3 to the pressing plate 2, leading to providing a good and stable quality of perforating.

Furthermore, pushing the light irradiation device 3 into the opening 6 of the pressing plate 2 brings the contact 14 into contact with the contact 19, engages the light irradiation device 3 in the pressing plate 2 in the defined attitude, gives a feeling of click to an operator, by elastically deforming the support member; and therefore an operator will detect a firm engagement of the light irradiation device 3 in a normal attachment position.

In the embodiment as described above, the support member 20 is incorporated with the electrode member 18 and placed close to the contact 19; however, the support member is not necessarily incorporated with the electrode 18 and not necessarily placed at an adjacent position to the contact 19, provided that the support member has a constitution capable of supporting the light irradiation device 3 until the contact 14 comes in contact with the contact 19.

When the support member is formed in a separate body from the electrode member 18, a possible constitution is such that the support member is made of a sheet metal and projects into the opening 6 of the pressing plate 2 at an upper position to the contact 19.

Another constitution is also possible that the support member 20 is formed integrally with the pressing plate 2 using a synthetic resin or the like and projects into the opening 6 at an upper position to the contact 19.

When the support member 20 is constituted separately from the electrode member 18, if the support member is made of an elastic material, it will give a feeling of click to an operator in engaging the light irradiation device 3 in the opening 6.

As described above, since the support member is placed before the contact of the pressing body coming in contact with the contact of the light irradiation device in the direction of inserting the light irradiation device to the pressing body, a part of the light irradiation device is supported by the support member and the contacts of the light irradiation device and the pressing plate can be supported in a noncontact state, while engaging the light irradiation device in the pressing body. Thus, the light irradiation device will not operate in an insufficient attachment state, thereby preventing a defect due to undesirable irradiation in perforating.

And, further pressing the light irradiation device toward the pressing body and attaching the light irradiation device firmly to the pressing body in the defined attitude will elastically deform the support member and will attach the light irradiation device to the pressing body in the defined attitude, bringing the contact of the light irradiation device into contact with the contact of the pressing body. Thus, only when the light irradiation device is attached to the pressing body in the defined attitude, the light irradiation device starts to process a good perforation.

Furthermore, since the support member has elasticity, when the light irradiation device is attached to the pressing body in the defined attitude, the support member will elastically deform and give a feeling of click; an operator can judge the attachment of the light irradiation device, which will be a support for a good perforating.

What is claimed is:

1. A heatsensitive stencil sheet perforating device comprising:

a pedestal for an original mounted thereon;

a pressing body attached pivotaly on one end of the pedestal, for supporting a heatsensitive stencil sheet on an area corresponding to the original mounted on the pedestal;

a light irradiation device attached detachably to the pressing body, said light irradiation device having a light source for irradiating the heatsensitive stencil sheet;

a power supply device installed inside of the pressing body for supplying electric energy to the light irradiation device to emit light from the light source;

a first contact member attached to the light irradiation device, connected to the light source;

a second contact member attached to the pressing member, connected to the power source of the power supply device so as to come into contact with the first contact member when the light irradiation device is attached to the pressing body in a defined state; and a support member attached to the pressing body, for supporting the light irradiation device by receiving a part of the light irradiation device so as not to bring the first contact member into contact with the second contact member, when the light irradiation device is attached to the pressing body not in the defined state.

2. A heatsensitive stencil sheet perforating device comprising:

a pedestal for an original mounted thereon;

a pressing body attached pivotaly on one end of the pedestal, said pressing body having a first opening and a transparent member, said first opening being formed on an area corresponding to the original on the pedestal, cut from a back side facing the pedestal to a front side, a opposite side of the back side, said transparent member being attached to the opening of the back side of the first opening for supporting a heatsensitive stencil sheet, a light irradiation device attached detachably in a desired state to the first opening from the front side of the pressing body, said light irradiation device having a housing including a second opening with virtually the same circumferential shape as that of the first opening of the pressing body and a light source installed inside of the housing for irradiating the heatsensitive stencil sheet from the second opening through the first opening of the pressing body;

a power supply device installed inside of the pressing body, for supplying electric energy to the light irradiation device to emit light from the light source;

a first contact member connected to the light source, attached to a part adjacent to the second opening of the housing of the light irradiation device;

a second contact member attached on the first opening of the pressing body, connected to a power source of the power supply device so as to come into contact with the first contact member, when the light irradiation device is attached in the first opening of the pressing body in a defined state; and a support member formed in the first opening of the pressing body, for supporting the light irradiation device by receiving a part of the light irradiation device so as not to bring the first contact member into contact with the second contact member, when the light irradiation device is attached to the pressing body not in the defined state.

3. A heatsensitive stencil sheet perforating device as claimed in claim 2, wherein the supporting member is made of an elastically deformable material.

4. A heatsensitive stencil sheet perforating device as claimed in claim 3, wherein the second contact member is an elastic member placed in the first opening of the pressing body; the support member is an elastic member placed at a farther position from the transparent member than the second contact member, in the first opening of the pressing member; the defined state is a state where the second opening of the light irradiation device is virtually in contact with the transparent member, when the light irradiation device is put into the first opening of the pressing body; in a first case where the light irradiation device is attached to the pressing body as not in the defined state when the light irradiation device is put into the first opening of the pressing body, the housing of the light irradiation device is supported by the support member and the first contact member does not come into contact with the second contact member; in a second case where the light irradiation device is attached to the pressing body in the defined state, the support member is elastically deformed to hold the housing of the light irradiation device and the second contact member comes into contact with the first contact member.

5. A heatsensitive stencil sheet perforating device as claimed in claim 4, wherein the heatsensitive stencil sheet perforating device has a switch to electrically connect the light irradiation device to the power supply device when the pressing body is urged toward the base and the heatsensitive stencil sheet attached to the pressing body is brought into contact with the original on the pedestal.

* * * * *